United States Patent [19]

Johnston

[11] 4,174,138

[45] Nov. 13, 1979

[54] THRUST BEARING AND SEPARATOR

[75] Inventor: Dean E. Johnston, Thomaston, Conn.

[73] Assignee: The Torrington Company, Torrington, Conn.

[21] Appl. No.: 937,548

[22] Filed: Aug. 28, 1978

[51] Int. Cl.² ............................................. F16C 33/46
[52] U.S. Cl. ................................................. 308/235
[58] Field of Search .................. 308/235, 232–234, 308/219, 218

[56] References Cited

U.S. PATENT DOCUMENTS

| | | | |
|---|---|---|---|
| 1,440,312 | 12/1922 | Neal | 308/218 |
| 1,477,164 | 12/1923 | Close | 308/218 |
| 2,997,349 | 8/1961 | Pitner | 308/235 |
| 3,240,543 | 3/1966 | Benson | 308/235 |

*Primary Examiner*—Douglas C. Butler
*Attorney, Agent, or Firm*—Frank S. Troidl

[57] ABSTRACT

The separator is a single integral annular member with an inclined annular wall interconnecting a radially inner annular flange which extends in one longitudinal direction and a radially outer annular flange extending on the opposite side of the inclined wall in the opposite longitudinal direction from the inner annular flange. The new roller thrust bearing comprises the single integral separator between two thrust races.

4 Claims, 4 Drawing Figures

THRUST BEARING AND SEPARATOR

This invention relates to thrust bearings. More particularly this invention is a new roller bearing and a new separator for use in a roller thrust bearing.

Briefly described, the separator is a single integral annular member including a radially inner annular flange extending in one longitudinal direction, a radially outer annular flange extending in the opposite longitudinal direction from the inner annular flange, and an inclined annular wall interconnecting the flanges. A plurality of circumferentially spaced radially extending rolling member pockets is cut through the inclined wall and each extends at least partially along the inclined wall.

Briefly described, the new thrust bearing includes the single integral separator between two thrust races. The rolling members which may be rollers or needle rollers are positioned in the pockets to contact both thrust races.

The invention as well as its many advantages may be further understood by reference to the following detailed descriptions and drawings in which.

In the various figures, like parts are referred to by like numbers.

Figure 1:
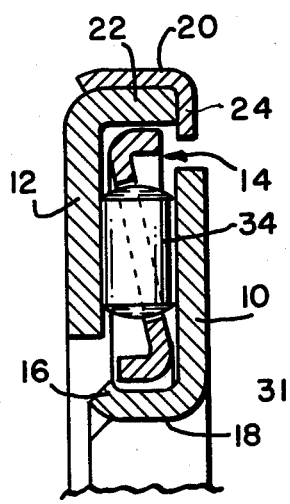
FIG. 1 is a fragmentary sectional view of one preferred embodiment of the new thrust bearing.

Referring particularly to FIG. 1, the new roller thrust bearing comprises a first thrust race 10 and an axially separated second thrust race 12, each with a raceway perpendicular to the bearing centerline. A single integral separator 14 is located between the thrust races 10 and 12.

A plurality of radially outwardly turned stake points 16 (only one shown in FIG. 1) on the free extremity of inner flange 18 of thrust race 10 prevents the freely rotatable separator 14 from falling axially out of the thrust race 10. An outer member or annular cup 20 which is wrapped around the outer flange 22 of thrust race 12 has a portion 24 extending radially inwardly past the inside periphery of flange 22 and at least partly past the outer periphery of separator 14. Thus the separator 14 cannot move from the second thrust race 12. Thus a thrust bearing and race assembly is provided which may be easily handled and shipped without fear of any of the parts falling out, and can be easily assembled in a mechanism, and can be used without the possibility of losing parts from the bearing during the life of the bearing.

Figure 3:
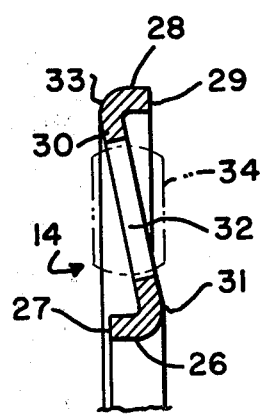
FIG. 3 is a fragmentary sectional view of the separator of FIG. 2.

Referring to FIG. 3, the new separator comprises a single integral annular member including a radially inclined or frustro-conical wall 30 interconnecting an inner annular flange 26 extending longitudinally in one axial direction and forming an acute angle with the inclined wall and an outer annular flange 28 on the opposite side of the inclined wall 30 extending in the opposite longitudinal direction from the inner annular flange 26 and forming an acute angle with the inclined wall. The free ends 27 and 29 of flanges 26 and 28 respectively do not extend axially outward from the inclined wall 30 further than the radial planes through the axially outermost surfaces 33 and 31 of the radially opposite peripheries of the separator, and preferably do not extend quite that far. Thus only smooth surfaces of the separator rub against the raceways, and thus reduces friction, frictional heat, abrasion, and noise as compared to having the free ends of the flanges abrade the races. Bearing life is increased, and noise level is lower.

Figure 2:
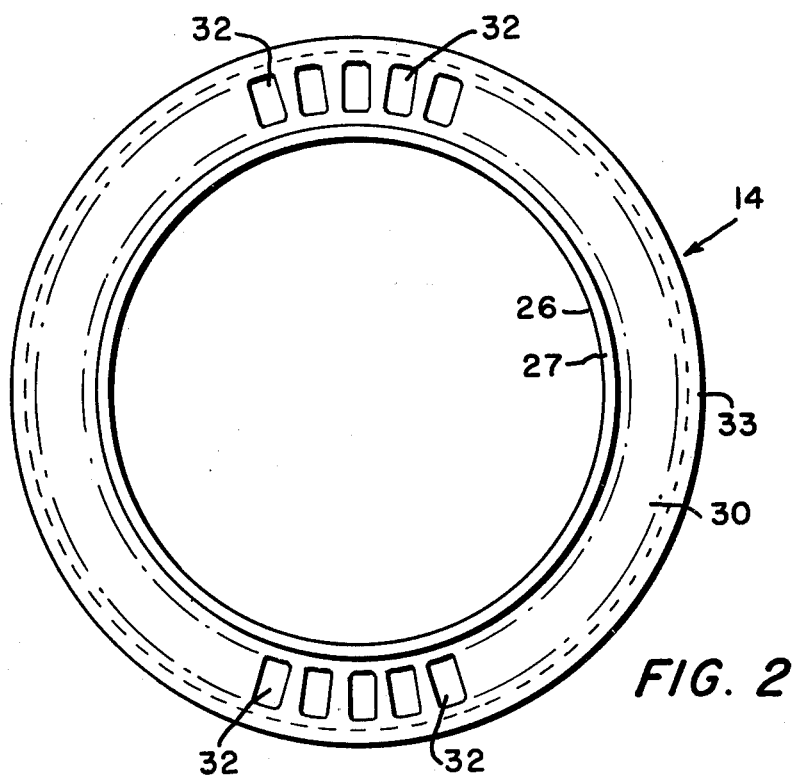
FIG. 2 is a front elevational view of the new separator.

A plurality of circumferentially spaced rolling member pockets 32 (See FIG. 2) is pierced through and extend radially along the inclined wall 30. A rolling member such as roller or needle roller 34 preferably is provided in each pocket 32, although some rollers may be omitted if desired.

Figure 4:
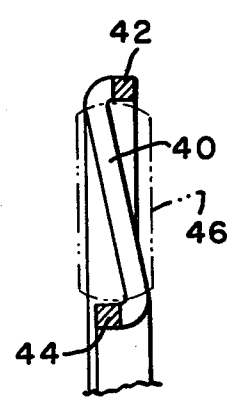
FIG. 4 is a fragmentary sectional view of another preferred embodiment of the separator.

In the embodiment shown in FIG. 4, the rolling member pockets 40 extend into the outer flange 42 and also extend into the inner flange 44 of the separator. The pockets might alternatively extend only to the flanges. This permits a larger roller 46 to be used with a separator having the same outside diameter and same inside diameter as the separator of FIG. 3. When desired, the roller pocket may extend only to or into one flange, and normally the preferred embodiment of this type would have the pocket extend to the outer flange so that the end of a roller flung radially outward by centrifugal force would bear against the smooth surface of the flange rather than against an edge of the roller pocket end wall.

The term separator as used above is meant also to include bearing cages and retainers which not only separate and guide the rollers, but also restrain the rollers from falling axially away from the cage when a race is not in position.

I claim:

1. A separator for use with a thrust bearing comprising: a single integral annular member including a radially inner annular flange extending in one longitudinal direction, a radially outer annular flange extending in the opposite longitudinal direction from said radially inner annular flange, an inclined annular wall interconnecting said two flanges, the free end of each flange not extending axially outward from the inclined annular wall further than the radial plane through the axially outermost surface of the radially opposite periphery of the separator; and a plurality of circumferentially spaced rolling member pockets, each extending at least partially along the inclined wall of said single member.

2. A separator for use in a thrust bearing in accordance with claim 1 wherein:
each rolling member pocket also extends into the inner flange and into the outer flange of the single member.

3. A thrust bearing comprising: a first thrust race and a second thrust race; a single integral separator comprising an annular member formed of an integral radially inner flange, a radially outer flange, and an inclined annular wall interconnecting said inner flange and outer flange and having a plurality of circumferentially separated rolling member pockets formed in the inclined annular wall, each rolling member pocket extending at least partially along said inclined annular wall; and a rolling member positioned in each pocket and in contact with both thrust races, the free end of each flange not extending axially outward from the inclined annular wall further than the radial plane through the axially outermost surface of the radially opposite periphery of the separator.

4. A thrust bearing in accordance with claim 3, wherein the rolling member pockets extend into the inner flange and also extend into the outer flange.

* * * * *